United States Patent

Harada et al.

[11] Patent Number: 5,223,547
[45] Date of Patent: Jun. 29, 1993

[54] POLYURETHANE, PROCESS FOR PRODUCING THE SAME, AND PROCESS FOR PRODUCING POLYURETHANE FOAM

[75] Inventors: Shoichiro Harada; Yasutoshi Isayama; Tetsuaki Fukushima; Masayoshi Morii; Hiroshi Kitagawa, all of Wakayama, Japan; Hiroshi Abe, Albany, Calif.

[73] Assignee: KAO Corporation, Tokyo, Japan

[21] Appl. No.: 797,350

[22] Filed: Nov. 25, 1991

[30] Foreign Application Priority Data

Nov. 27, 1990 [JP] Japan ................ 2-326696
May 10, 1991 [JP] Japan ................ 3-105674
May 10, 1991 [JP] Japan ................ 3-105675
May 10, 1991 [JP] Japan ................ 3-105676
May 10, 1991 [JP] Japan ................ 3-105677

[51] Int. Cl.$^5$ .................................. C08G 18/14
[52] U.S. Cl. .................................. 521/78; 521/131; 521/164; 521/167; 528/49; 528/78; 528/85
[58] Field of Search ........... 521/78, 131, 164, 167; 528/49, 78, 85

[56] References Cited

U.S. PATENT DOCUMENTS 3,325,306  6/1967  Caldwell et al. ........... 521/78
3,437,608  4/1969  Pohl et al. ................ 521/131
4,727,094  2/1988  Hoy et al. ................. 521/164

FOREIGN PATENT DOCUMENTS 0268906  6/1988  European Pat. Off. .
1966065  7/1971  Fed. Rep. of Germany .
2118001  7/1972  France .
2222406  3/1990  United Kingdom .
8601522  3/1986  World Int. Prop. O. .

*Primary Examiner*—Maurice J. Welsh
*Attorney, Agent, or Firm*—Birch, Stewart, Kolasch & Birch

[57] ABSTRACT

Processes for producing a polyurethane, a rigid polyurethane foam, a flexible polyurethane foam and a spray type rigid polyurethane foam are disclosed.

In these processes, a specified tertiary aminoalcohol is used as a polyol component and a catalyst.

40 Claims, 1 Drawing Sheet

F I G . 1

POLYURETHANE, PROCESS FOR PRODUCING THE SAME, AND PROCESS FOR PRODUCING POLYURETHANE FOAM

BACKGROUND OF THE INVENTION

1. Field of the Invention

The present invention relates to a novel polyurethane, a process for producing the same, and a process for producing a polyurethane foam. More particularly, the present invention is concerned with a process for producing a polyurethane which gives a polyurethane having excellent moldability in mold filling, substantially without the necessity of using a catalyst component commonly used for producing a polyurethane, a polyurethane produced by the process, a process for producing a rigid polyurethane foam excellent in mold filling, thermal insulation property and low-temperature dimensional stability, a process comprising a spray step for producing a rigid polyurethane foam having excellent mechanical properties and adhesive property, whereby the reaction of a polyol with an isocyanate can sufficiently proceed at low temperature, and a process for producing a foamed-in-mold flexible polyurethane foam for use in furniture and automobile cushions. More particularly, the present invention relates to a process for producing a flexible polyurethane foam by using a urethane feedstock containing a particular tertiary aminoalcohol and having an excellent high temperature moldability at the time of pouring of a urethane feedstock in mold foaming.

2. Description of the Related Art

Polyurethanes are used in various industrial fields, such as in the formation of elastomers, rigid foam, semi-rigid foam, flexible foam and microcellular foam, by virtue of their easiness of control of molding density, hardness of products and various properties, and their excellent moldability. In producing these polyurethanes, it is a common practice to use a tertiary amine or an organometallic catalyst as a polyurethane producing catalyst, in addition to a polyisocyanate component, and a polyol component for the purpose of promoting curing or foaming, which enables a polyurethane to be produced on an industrial scale.

Among the polyurethane producing catalysts, tertiary amines are widely used because they are useful for controlling the balance of the reaction. In many cases, however, they have a strong irritating odor, and cause skin irritation, and therefore cause problems in the working environment, and have the drawback that the odor lowers the value of the product.

Therefore, the present inventors have proposed using a tertiary amino alcohol represented by the general formula (O):

in which $R_a$ is a $C_2$ to $C_{24}$ straight-chain or branched alkylene group, an alicyclic alkylene group, an aralkylene group or $-(CH_2CH_2O)_p-(CH_2CH_2)_q-$ (where p is 0 or a positive integer and q is a positive integer), $R_b$ is a $C_1$ to $C_{24}$ straight-chain or branched alkyl group or an aralkyl group and l is a positive integer of 2 to 50, as a catalyst and a raw material for polyurethane production (Refer to U.S. patent application Ser. No. 563712).

Further, when a rigid polyurethane foam or the like is molded by mold foaming for a use in a refrigerator or a panel, an improvement in the mold filling relating to the fluidity of the resin within a mold is required, so that a method for lowering the density in a high yield has been desired in the art.

In recent years, the use of chlorofluorocarbons as a foaming agent has been legally regulated for the protection of the ozonosphere, and trichlorofluoromethane (R-11), which has hitherto been used for the production of a rigid polyurethane foam, is among the substances subject to the regulation. This brings about a problem of the necessity of reducing the use of trichlorofluoromethane. Examples of the reduction means proposed in the art include one wherein the amount of water used is increased to reduce the amount of trichlorofluoromethane (the so-called "chlorofluorocarbons-poor formulation") and one wherein use is made of 1,1-dichloro-2,2,2-trifluoroethane (R-123) or 2,2-dichloro-2-fluoroethane (R-141b), having ozone destruction factors (ODP) smaller than that of trichlorofluoromethane.

In the chlorofluorocarbons-poor formulation wherein the amount of water used as a foaming agent is increased, the increase in the amount of water inevitably accelerates the reaction of water with the polyisocyanate component. This causes the amount of formation of a urea bond derived from the evolution of carbon dioxide to be increased, so that the balance between the foaming reaction and the resinification reaction is lost, which causes the mold filling of the polyurethane form to be significantly lowered. The use of 1,1-dichloro-2,2,2-trifluoroethane or 2,2-dichloro-2-fluoroethane instead of trichlorofluoromethane makes it necessary to increase the amount of use of water, because the low temperature dimensional stability, compressive strength and mold filling are lowered thereby. This, however, causes the mold filling to be further lowered.

The rigid polyurethane foam, produced by a process comprising a spray step (a spray type rigid polyurethane foam, hereinafter), is used mainly for the thermal insulation of the internal wall and ceiling of houses, and the thermal insulation of tanks. A special foaming machine is used for the foaming work of the spray type rigid polyurethane foam. An air spray foaming machine is a system wherein compressed air is introduced into a mixing gun, while an airless foaming machine is a system wherein a feedstock is introduced into a mixing gun through the use of a lightweight compresser, and then sprayed. A liquid mixture comprising a polyol component and an isocyanate component is sprayed on a face of an article through the use of the above-described foaming machines, and a thermal insulation layer, comprising a rigid polyurethane foam, is formed on that face through the utilization of the properties of the mixture of rapidly thickening, foaming and forming a high-molecular weight polymer.

The above-described useful spray type rigid polyurethane foam has found an expanded application, and an increase in the amount of use thereof has brought about various problems. One of the problems is that the bonding strength between the foam and the adherend material is so poor, that the foam peels off or falls down with the lapse of time to impair the thermal insulation effect, so that dewing becomes liable to occur.

Further, the regulation of the use of chlorofluorocarbons such as trichlorofluoromethane has brought about a tendency to increase the amount of incorporation of water in the foaming agent which further renders the above-described problems serious. Specifically, when the amount of the chlorofluorocarbon subject to the regulation is reduced by increasing the amount of incorporation of water, the agglomeration caused by a urea bond formed by the reaction of water with the isocyanate violently occurs, and further the boundary between the urethane foam and the adherend or the surface of the foam suffers from less accumulation of the heat of reaction, which brings about drawbacks, such as a lack in the self-bonding strength which is the most important property of the spray type rigid polyurethane foam, and an increase in the fragility. This tendency becomes conspicuous in conducting the spraying at a relatively low temperature of 5° C. or below.

The flexible hot mold foam is produced by blending and sufficiently mixing a polyether polyol, a polyisocyanate, a foaming agent, a silicone foam stabilizer and a catalyst with each other, pouring the mixture into a mold and then heating the mixture to allow a reaction to proceed. In this case, after the temperature of the mold is adjusted to 35° to 45° C., a urethane feed-stock is poured into the mold to conduct foaming, and cured in a furnace at 160° to 200° C., and the cured foam is demolded. The reason why the temperature of the mold is adjusted to 35° to 45° C. resides in that when it is below 35° C., an increase in the foam density and insufficient curing of the foam are liable to occur and further the time taken from the pouring to the demolding is lengthened, which hinders the production of the foam. When the temperature of the mold exceeds 45° C., a crack occurs within the foam, so that no good product can be obtained. Although trichlorofluoromethane is used in the production of a foam having a low density and a low hardness, it is desired to reduce or discontinue the use of trichlorofluoromethane for the reasons mentioned hereinabove.

Therefore, if a good foam can be uniformly produced at a mold temperature of 45° C. or above, the step of cooling the mold after the demolding of the foam in a foam production line can be remarkably omitted, which contributes to the prevention of energy loss. Further, the foam produced at a higher mold temperature has a lowered density due to an enhancement in the foaming efficiency. In attaining the same density as that of the foam at an ordinary mold temperature, the amount of the foaming agent can be reduced, whereby the use of the chlorofluorocarbons subject to the regulation can be reduced or discontinued.

SUMMARY OF THE INVENTION

The present inventors have made intensive studies with a view to solving the above-described problems and, as a result, have found that in the production of a polyurethane and a polyurethane foam from a polyisocyanate component and a polyol component, the use of a tertiary aminoalcohol represented by the general formula (I)

(I)

in which each $R_1$ is an alkylene group having 2 to 24 carbon atoms, being straight or branched, a cycloalkylene group having 3 to 24 carbon atoms, an alicyclic alkylene group having 4 to 24 carbon atoms and having 1 to 6 carbon atoms in the alkylene portion, an arylene group having 6 to 24 carbon atoms, an aralkylene group having 7 to 24 carbon atoms and having 1 to 6 carbon atoms in the alkylene portion, or —$(CH_2CH_2O)_p$—$(CH_2CH_2)_q$—, p being zero or a positive number, q being a positive number, each $R_2$ is an alkyl group having 1 to 24 carbon atoms, being straight or branched, an aryl group having 6 to 24 carbon atoms or an aralkyl group having 7 to 24 carbon atoms and having 1 to 6 carbon atoms in the alkylene portion, and n is a positive number of 1 to 50, as part or the whole of the polyol component enables the production of a polyurethane and a polyurethane foam substantially without the necessity for using a catalyst, such as a tertiary amine, and the resultant polyurethane and polyurethane foam have improved properties with respect to mold filling, thermal insulation, low-temperature dimensional stability, etc., which has led to the completion of the present invention.

Accordingly, the first embodiment of the present invention provides a process for producing a polyurethane, comprising the step of reacting a polyisocyanate component with a polyol component, the polyol component comprising, as all or part thereof, a tertiary aminoalcohol having the formula (I):

(I)

in which each $R_1$ is an alkylene group having 2 to 24 carbon atoms, being straight or branched, a cycloalkylene group having 3 to 24 carbon atoms, an alicyclic alkylene group having 4 to 24 carbon atoms and having 1 to 6 carbon atoms in the alkylene portion, an arylene group having 6 to 24 carbon atoms, an aralkylene group having 7 to 24 carbon atoms and having 1 to 6 carbon atoms in the alkylene portion or —$(CH_2CH_2O)_p$—$(CH_2CH_2)_q$—, p being zero or a positive number, q being a positive number, each $R_2$ is an alkyl group having 1 to 24 carbon atoms, being straight or branched, an aryl group having 6 to 24 carbon atoms or an aralkyl group having 7 to 24 carbon atoms and having 1 to 6 carbon atoms in the alkylene portion, and n is a positive number of 1 to 50.

It is preferable that the n in the formula (I) is a positive number of 2 to 50.

It is preferable that each $R_1$ is an alkylene group having 6 to 9 carbon atoms, being straight or branched, each $R_2$ is an alkyl group having 1 to 4 carbon atoms, being straight or branched, and n is an integral number of 2 to 18 in the formula (I).

Furthermore, it is preferable to use a tertiary aminoalcohol having the formula (II):

(II)

in which each $R_3$ is an alkylene group having 2 to 24 carbon atoms, being straight or branched, a cycloalkylene group having 3 to 24 carbon atoms, an alicyclic alkylene group having 4 to 24 carbon atoms and having 1 to 6 carbon atoms in the alkylene portion, an arylene group having 6 to 24 carbon atoms, an aralkylene group having 7 to 24 carbon atoms and having 1 to 6 carbon atoms in the alkylene portion, or —$(CH_2CH_2O)_p$—$(CH_2CH_2)_q$—, p being zero or a positive number, q being a positive number, each $R_4$ is an alkyl group having 1 to 24 carbon atoms, being straight or branched, an aryl group having 6 to 24 carbon atoms or an aralkyl group having 7 to 24 carbon atoms and having 1 to 6 carbon atoms in the alkylene portion, and m is a positive number of 1 to 50; as a third component in the step of reacting a polyisocyanate component with the polyol component.

The amount of the third component having the formula (II) is preferably 30% and less by weight based on the total amount of the tertiary aminoalcohol having the formula (I) and the tertiary aminoalcohol having the formula (II) when the third component is used.

It is preferable that the polyol component includes 1 to 50% by weight of the tertiary aminoalcohol having the formula (I).

It is preferable that each $R_1$ is $-(CH_2CH_2O)_p-(CH_2CH_2)_q-$, p being zero to 15, q being 1 to 15, and/or that each $R_3$ is $-(CH_2CH_2O)_p-(CH_2CH_2)_q-$, p being zero to 15, q being 1 to 15.

It is also preferable that each $R_1$ is an alkylene group having 6 to 9 carbon atoms, being straight or branched, each $R_2$ is an alkyl group having 1 to 4 carbon atoms, being straight or branched, and n is 1 to 30 in the formula (I), and/or that each $R_3$ is an alkylene group having 6 to 9 carbon atoms, being straight or branched, each $R_4$ is an alkyl group having 1 to 4 carbon atoms, being straight or branched, and m is 1 to 30 in the formula (II) when the third component is used.

The second embodiment of the present invention provides a polyurethane produced by abovementioned process.

The third embodiment of the present invention provides a process for producing a polyurethane foam, comprising the step of reacting a polyisocyanate component with a polyol component in the presence of a foaming agent, the polyol component comprising, as all or part thereof, a tertiary aminoalcohol having the formula (I):

(I)

in which each $R_1$ is an alkylene group having 2 to 24 carbon atoms, being straight or branched, a cycloalkylene group having 3 to 24 carbon atoms, an alicyclic alkylene group having 4 to 24 carbon atoms and having 1 to 6 carbon atoms in the alkylene portion, an arylene group having 6 to 24 carbon atoms, an aralkylene group having 7 to 24 carbon atoms and having 1 to 6 carbon atoms in the alkylene portion, or $-(CH_2CH_2O)_p-(CH_2CH_2)_q-$, p being zero or a positive number, q being a positive number, each $R_2$ is an alkyl group having 1 to 24 carbon atoms, being straight or branched, an aryl group having 6 to 24 carbon atoms, or an aralkyl group having 7 to 24 carbon atoms and having 1 to 6 carbon atoms in the alkylene portion, and n is a positive number of 1 to 50.

It is preferable that the n in the formula (I) is an integral number of 2 to 50.

Furthermore, it is preferable to use a tertiary aminoalcohol having the formula (II):

(II)

in which each $R_3$ is an alkylene group having 2 to 24 carbon atoms, being straight or branched, a cycloalkylene group having 3 to 24 carbon atoms, an alicyclic alkylene group having 4 to 24 carbon atoms and having 1 to 6 carbon atoms in the alkylene portion, an arylene group having 6 to 24 carbon atoms, an aralkylene group having 7 to 24 carbon atoms and having 1 to 6 carbon atoms in the alkylene portion, or $-(CH_2CH_2O)_p-(CH_2CH_2)_q-$, p being zero or a positive number, q being a positive number, each $R_4$ is an alkyl group having 1 to 24 carbon atoms, being straight or branched, an aryl group having 6 to 24 carbon atoms or an aralkyl group having 7 to 24 carbon atoms and having 1 to 6 carbon atoms in the alkylene portion, and m is a positive number of 1 to 50; as a third component in the step of reacting a polyisocyanate component with the polyol component.

The amount of the third component having the formula (II) is preferably 30% and less by weight based on the total amount of the tertiary aminoalcohol having the formula (I) and the tertiary aminoalcohol having the formula (II) when the third component is used.

It is preferable that $R_1$ each is $-(CH_2CH_2O)_p-(CH_2CH_2)_q-$, p being zero to 15, q being 1 to 15, and/or that each $R_3$ is $-(CH_2CH_2O)_p-(CH_2CH_2)_q-$, p being zero to 15, q being 1 to 15.

It is also preferable that each $R_1$ is an alkylene group having 6 to 9 carbon atoms, being straight or branched, each $R_2$ is an alkyl group having 1 to 4 carbon atoms, being straight or branched, and n is a positive number of 1 to 30 in the formula (I), and/or that each $R_3$ is an alkylene group having 6 to 9 carbon atoms, being straight or branched, each $R_4$ is an alkyl having 1 to 4 carbon atoms, being straight or branched, and m is a positive number of 1 to 30 in the formula (II) when the third component is used.

It is preferable to use a compound selected from the group consisting of aliphatic amines and aromatic amines in the step of reacting a polyisocyanate component with the polyol component.

It is preferable to use one or more compounds selected from the group consisting of triethanolamine, tolylenediamine (toluylenediamine) and a diamine compound represented by general formula (III):

(III)

in which $R_5$ is an alkylene group having 2 to 8 carbon atoms, being straight or branched; as the compound selected from the group consisting of aliphatic amines and aromatic amines.

The amount of the compound selected from the group consisting of aliphatic amines and aromatic amines is preferably 1 to 30 parts by weight based on 100 parts by weight of the total amount of the polyol component.

It is preferably that the polyol component includes 1 to 50% by weight of the tertiary aminoalcohol having the formula (I).

Furthermore, it is preferable to use a polyol having an OH value of 1000 and above as the polyol component, together with the tertiary aminoalcohol having the formula (I), and a compound selected from the group consisting of aliphatic amines and aromatic amines in the step of reacting a polyisocyanate component with the polyol component.

It is preferable to use one or more compounds selected from the group consisting of $H_2O$ (water), 1,1- dichloro-2,2,2-trifluoroethane and 2-dichloro-2-trifluoroethane as the foaming agent.

When the polyurethane foam is a rigid polyurethane foam, it is preferable that each $R_1$ is an alkylene group having 3 to 9 carbon atoms, being straight or branched, each $R_2$ is an alkyl group having 1 to 4 carbon atoms, being straight or branched, n is an integral number of 2 to 18 in the formula (I).

Furthermore, it is preferable to use a polyol having an OH value of 1000 and above as the polyol component together with the tertiary aminoalcohol having the formula (I) when the polyurethane foam is a rigid polyurethane foam.

As the polyol having the OH value of 1000 and above, ethyleneglycol and glycerol are more preferable.

It is also preferable that, when the polyol having an OH value of 1000 and above is used as the polyol component together with the tertiary aminoalcohol having the formula (I), the amount of the tertiary aminoalcohol having the formula (I) is 1 to 50% by weight based on the total amount of the polyol component, and the amount of the polyol having the OH value of 1000 and above is 1 to 50% by weight based on the total amount of the polyol component when the polyurethane foam is a rigid polyurethane foam.

It is also preferable that the average OH value of the polyol component is 300 and above when the polyurethane foam is a rigid polyurethane foam.

When the polyurethane foam is a flexible polyurethane foam, it is preferable that each $R_1$ is an alkylene group having 2 to 20 carbon atoms, being straight or branched, an alicyclic alkylene group having 4 to 20 carbon atoms and having 1 to 6 carbon atoms in the alkylene portion, an aralkylene group having 7 to 20 carbon atoms and having 1 to 6 carbon atoms in the alkylene portion, or $-(CH_2CH_2O)_p-(CH_2CH_2)_q-$, p being zero or a positive number, q being a positive number, each $R_2$ is an alkyl group having 1 to 24 carbon atoms, being straight or branched, or an aralkyl group having 7 to 24 carbon atoms and having 1 to 6 carbon atoms in the alkylene portion and n is an integral number of 2 to 50 in the formula (I).

When the polyurethane foam is a flexible polyurethane foam, it is also preferable that each $R_1$ is an alkylene group having 6 to 9 carbon atoms, being straight or branched, each $R_2$ is an alkyl group having 1 to 4 carbon atoms, being straight or branched, and n is an integral number of 2 to 18 in the formula (I).

It is preferable that the average OH value of the polyol component is 200 and below when the polyurethane foam is a flexible polyurethane foam.

Furthermore, it is preferable to use $H_2O$ (water) as the foaming agent in amount of 2 to 8 parts by weight based on 100 parts by weight of the total amount of the polyol component when the polyurethane foam is a flexible polyurethane foam.

The fourth embodiment of the present invention provides a process for producing a polyurethane foam by the spray method, comprising the step of spraying a mixture containing reacting raw materials and a foaming agent and the step of reacting a polyisocyanate component with a polyol component in the presence of a foaming agent, the polyol component comprising, as all or part thereof, a tertiary aminoalcohol having the formula (I):

in which each $R_1$ is an alkylene group having 2 to 24 carbon atoms, being straight or branched, a cycloalkylene group having 3 to 24 carbon atoms, an alicyclic alkylene group having 4 to 24 carbon atoms and having 1 to 6 carbon atoms in the alkylene portion, an arylene group having 6 to 24 carbon atoms, an aralkylene group having 7 to 24 carbon atoms and having 1 to 6 carbon atoms in the alkylene portion, or $-(CH_2CH_2O)_p-(CH_2CH_2)_q-$, p being zero or a positive number, q being a positive number, each $R_2$ is an alkyl group having 1 to 24 carbon atoms, being straight or branched, an aryl group having 6 to 24 carbon atoms or an aralkyl group having 7 to 24 carbon atoms and having 1 to 6 carbon atoms in the alkylene portion, and n is a positive number of 1 to 50; and $H_2O$ (water) being used as the foaming agent in amount of 2 to 8 parts by weight based on 100 parts by weight of the total amount of the polyol component.

It is preferable that each $R_1$ is an alkylene group having 2 to 20 carbon atoms, being straight or branched, an alicyclic alkylene group having 4 to 20 carbon atoms and having 1 to 6 carbon atoms in the alkylene portion, an aralkylene group having 7 to 20 carbon atoms and having 1 to 6 carbon atoms in the alkylene portion, or $-(CH_2CH_2O)_p-(CH_2CH_2)_q-$, p being zero or a positive number, q being a positive number, each $R_2$ is an alkyl group having 1 to 20 carbon atoms, being straight or branched, an aralkyl group having 7 to 20 carbon atoms and having 1 to 6 carbon atoms in the alkylene portion and n is an integral number of 2 to 50 in the formula (I).

It is also preferable that each $R_1$ is an alkylene group having 6 to 9 carbon atoms, being straight or branched, each $R_2$ is an alkyl group having 1 to 4 carbon atoms, being straight or branched, and n is an integral number of 2 to 18 in the formula (I).

Furthermore, it is preferable to use a tertiary aminoalcohol having the formula (II):

in which each $R_3$ is an alkylene group having 2 to 24 carbon atoms, being straight or branched, a cycloalkylene group having 3 to 24 carbon atoms, an alicyclic alkylene group having 4 to 24 carbon atoms and having 1 to 6 carbon atoms in the alkylene portion, an arylene groups having 6 to 24 carbon atoms, an aralkylene group having 7 to 24 carbon atoms and having 1 to 6 carbon atoms in the alkylene portion, or $-(CH_2CH_2O)_p-(CH_2CH_2)_q-$, p being zero or a positive number, q being a positive number, each $R_4$ is an alkyl group having 1 to 24 carbon atoms, being straight or branched, an aryl group having 6 to 24 carbon atoms or an aralkyl group having 7 to 24 carbon atoms and having 1 to 6 carbon atoms in the alkylene portion and m is a positive number of 1 to 50; as a third component in the step of reacting a polyisocyanate component with the polyol component.

The amount of the third component having the formula (II) is preferably 30% and less by weight based on the total amount of the tertiary aminoalcohol having the formula (I) and the tertiary aminoalcohol having the formula (II) when the third component is used.

It is preferable that each $R_1$ is $-(CH_2CH_2O)_p-(CH_2CH_2)_q-$, p being zero to 15, q being 1 to 15, and/or that each $R_3$ is $-(CH_2CH_2O)_p-(CH_2CH_2)_q-$, p being zero to 15, q being 1 to 15.

It is also preferable that each $R_1$ is an alkylene group having 6 to 9 carbon atoms, being straight or branched, each $R_2$ is an alkyl group having 1 to 4 carbon atoms, being straight or branched, and n is a positive number of 1 to 30 in the formula (I), and/or that each $R_3$ is alkylene group having 6 to 9 carbon atoms, being straight or branched, each $R_4$ is an alkyl group having 1 to 4 carbon atoms, being straight or branched, and m is a positive number of 1 to 30 in the formula (II) when the third component is used.

The tertiary aminoalcohols represented by the general formulae (I) and (II) have the following features. Because they each have a tertiary amino group in its molecular skeleton, they exhibit a catalytic activity in the reaction of a polyisocyanate compound with an active hydrogen compound. Further, the tertiary aminoalcohol, as such, reacts with an isocyanate group by virtue of the presence of a terminal hydroxyl group, and consequently is incorporated in the polyurethane resin skeleton. Further, since the tertiary aminoalcohol represented by the general formula (I) is a diol type, it neither inhibits an increase in the molecular weight of the polyurethane resin nor deteriorates the final properties. Therefore, unlike the conventional tertiary amine catalyst, the tertiary aminoalcohols represented by the general formulae (I) and (II) per se are less liable to cause a bad odor, because they have a terminal hydroxyl group and a molecular weight on a certain level. Therefore, though they are incorporated in the polyurethane resin skeleton, neither the polyurethane resin nor the polyurethane foam has a bad odor, so that no lowering of the commercial value of the product occurs.

In the production of a rigid polyurethane foam, the balance between the gas evolution rate and the resin cure rate in the reaction is important for improving the mold filling. When the gas evolution rate is higher than the resin cure rate, no sufficient amount of gas can be entrapped in the resin and no necessary foam volume is obtained, so that the mold filling becomes poor. On the other hand, when the resin cure rate is higher than the gas evolution rate, the resin viscosity becomes so high that the so-called "liquid flow" lowers, which causes the mold filling of the rigid polyurethane foam to be lowered.

Also, when water and trichlorofluoromethane are used in the conventional proportions as a foaming agent, the enhancement in the resin cure rate through a change in the proportion of the polyol, catalyst, or the like, for the purpose of improving the productivity or the like, causes the balance necessary for the mold filling between the gas evolution rate and the resin cure rate to be lost, which lowers the mold filling of the rigid polyurethane foam. By contrast, the use of the tertiary aminoalcohol represented by the general formula (I) as part or the whole of the polyol component, or the use of the tertiary aminoalcohol represented by the general formula (II) together with the tertiary aminoalcohol represented by the general formula (I) promotes the resinification in an early stage of the reaction and the gasification of trichlorofluoromethane, so that the balance necessary for the mold filling between the gas evolution rate and the resin cure rate is maintained, and the mold filling is improved.

In the chlorofluorocarbon-poor formulation wherein the amount of use of trichlorofluoromethane has been reduced, because the amount of water used is increased, a rapid foam curing reaction lowers the mold filling of the polyurethane foam. In such a formulation, the sue of the tertiary aminoalcohol(s) according to the present invention makes it unnecessary to use the conventional catalyst component, and further suppresses the reaction of water with the isocyanate group by virtue of the feature of the tertiary aminoalcohol(s) according to the present invention, so that the mold filling of the polyurethane foam is not impaired.

When 1,1-dichloro-2,2,2-trifluoroethane or 2,2-dichloro-2-fluoroethane is used instead of trichlorofluoromethane, the mold filling lowers due to drawbacks such as a difference in the boiling point between these substances and trichlorofluoromethane, a lowering in the resinification reaction rate due to the dissolution in the resin, and an accompanying delay of the evolution of the chlorofluorocarbon gas. By contrast, the use of the tertiary aminoalcohol(s) according to the present invention enhances the resinification reaction rate to prevent the lowering in the mold filling of the polyurethane foam.

In the reaction of the polyol component containing the tertiary aminoalcohol represented by the general formula (I) with the isocyanate, or in the reaction of the tertiary aminoalcohols represented by the general formulae (I) and (II) with the isocyanate in the production of the spray type polyurethane foam, it is possible to complete the reaction through an enhancement in the reaction rate in proportion to the amount of incorporation of the tertiary aminoalcohol(s), and the reaction can proceed at a low temperature of 5° C. or below. Since the reaction can sufficiently proceed at such a low temperature, the necessary mechanical properties and bonding strength of the polyurethane foam can be maintained, so that neither peeling nor falling of the thermal insulation layer from the adherend occurs after the spraying.

Further, also in the formulation of the spray type polyurethane foam wherein the amount of use of chlorofluorocarbons subject to regulation, such as trichlorofluoromethane, is reduced, and water is used in a large amount as a foaming agent, a desired bonding strength can be obtained, and neither peeling nor falling occurs, even though the reaction proceeds at a low temperature of 5° C. or below.

Further, it has been found that in the production of a flexible polyurethane foam, the use of the tertiary aminoalcohol represented by the general formula (I), or the use of the tertiary aminoalcohol represented by the general (II) together with the tertiary amino alcohol represented by the general formula (I), and the use of a particular amount of water as a foaming agent gives a good foam free from any cracking in the production of a flexible hot mold polyurethane foam at a high mold temperature.

DETAILED DESCRIPTION OF THE INVENTION

In the present invention, the tertiary aminoalcohols represented by the general formulae (I) and (II) may have various structures and molecular weights through variation in the diol and primary amine as the starting materials. A diol having 2 to 24 carbon atoms is used as a diol for the production of the tertiary aminoalcohols, and examples thereof include 1,3-butanediol, 1,4-butanediol, 1,5-pentanediol, 1,6-hexanediol, 1,9-nonanediol, 1,10-decanediol, diethylene glycol, triethylene glycol, tetraethylene glycol, 1,4-cyclohexanedimethanol, 2-ethyl-1,3-hexanediol, 3-methyl-1,5-pentanediol and 1,4-hydroquinone. The primary amine may be a straight-chain or branched aliphatic primary amine or an aralkyl primary amine having 1 to 24 carbon atoms. Examples thereof include methylamine, propylamine, isopropylamine, butylamine, 2-ethylhexylamine, heptylamine, octylamine, decylamine, dodecylamine, cetylamine, stearylamine, docosylamine, oleylamine, benzylamine, phenethylamine and aniline.

The process for producing the tertiary aminoalcohols according to the present invention will now be described in more detail.

In the reaction of a diol with a primary amine to give a tertiary aminoalcohol, a catalyst mainly composed of copper-noble metal, for example, copper-nickel-group VIII platinum element, copper-chromium-group VIII platinum element, copper-zinc-group VIII platinum element, copper-manganese-group VIII platinum element, copper-iron-group VIII platinum element and copper-cobalt-group VIII platinum element is used, and the reaction system is stirred at a temperature of 150° to 250° C. under atmospheric or elevated pressure while continuously or intermittently removing water formed by the reaction in the presence of the above-described catalyst outside the reaction system.

In this case, the diol may be continuously added during the reaction, originally fed or fed in portions in a particular amount.

When the primary amine is a gas, it may be continuously or intermittently blown during the reaction. Alternatively, a predetermined amount of the primary amine may be fed at once under pressure. On the other hand, when the primary amine is a liquid, it may be continuously fed, or a predetermined amount thereof may be originally fed.

The molar ratio of the amine to the diol should be 0.7 or more, preferably 1 or more. In the case of a gaseous amine, the gaseous amine of excess volume is fed together with hydrogen gas and they may be recovered and circulated for reuse.

In the process for producing the tertiary aminoalcohol represented by the general formula (I) according to the present invention, it is preferred to remove water formed by the reaction of the diol with the primary amine outside the reaction system. When the formed water is not removed outside the reaction system, the catalytic activity and selectivity of the resulting tertiary aminoalcohol often are lowered. For example, when the reaction is conducted without removal of the formed water, the yield of the intended tertiary aminoalcohol often lowers due to an increase in the amount of the disproportionation product.

The tertiary aminoalcohol represented by the general formula (II) is formed as the disproportionation product of the tertiary aminoalcohol represented by the general formula (I), and it is also possible to use a mixture containing these tertiary aminoalcohols represented by the general formulae (I) and (II). Therefore, it is not always necessary to remove the formed water as far as the amount of the formed water is such that the amount of the tertiary aminoalcohol represented by the general formula (II) as the disproportionation product of the tertiary aminoalcohol represented by the general formula (I) is within the limits of giving the intended polyurethane when the mixture containing these tertiary aminoalcohols represented by the general formulae (I) and (II) is used to product the polyurethane.

Although the removal of the formed water may be intermittently or continuously conducted during the reaction and may be arbitrarily removed so that the formed water does not exist in the reaction system for a long period of time, it is preferred to continuously remove the formed water. More specifically, it is a common practice to introduce a suitable amount of hydrogen gas into the reaction system during the reaction to distill off the formed water together with hydrogen gas. It is also possible to concentrate and separate the formed water by means of a condenser, and to circulate the hydrogen gas for reuse. Further, a suitable solvent may be added during the reaction to distill off the formed water in the form of an azeotrope with this solvent. Also an inert solvent may be added for the purpose of lowering the viscosity of the reaction product system.

In the present invention, although a catalyst which has been previously reduced with hydrogen gas may be used, it is preferred that the catalyst may be reduced by putting a catalyst before reduction into a reactor together with a diol as a starting material and raising the reaction temperature while introducing hydrogen gas or a mixture of hydrogen gas with a gaseous amine when the amine to be reacted is a gaseous one.

The tertiary aminoalcohol used in the present invention has a structure represented by the general formula (I). As described above, depending upon the reaction conditions, the tertiary aminoalcohol may be prepared in the form of a mixture of a diol represented by the general formula (I) with a mono-ol represented by the general formula (II). In general, the diol and mono-ol are obtained in a molar ratio of the diol to the mono-ol in the range of from 70/30 to 100/0.

In the general formula (I), each $R_1$ is an alkylene group having 2 to 24 carbon atoms, being straight or branched, a cycloalkylene group having 3 to 24 carbon atoms, an alicyclic alkylene group having 4 to 24 carbon atoms and having 1 to 6 carbon atoms in the alkylene portion, an arylene group having 6 to 24 carbon atoms, an aralkylene group having 7 to 24 carbon atoms and having 1 to 6 carbon atoms in the alkylene portion, or $-(CH_2CH_2O)_p-(CH_2CH_2)_q-$, p being zero or a positive number, q being a positive number, preferably a straight-chain or branched alkylene group having 6 to 9 carbon atoms. Each $R_2$ is an alkyl group having 1 to 24 carbon atoms, being straight or branched, an aryl group having 6 to 24 carbon atoms or an aralkyl group having 7 to 24 carbon atoms and having 1 to 6 carbon atoms in the alkylene portion. The term "aralkyl" as used herein is intended to mean an alkyl group having an aromatic ring, such as a benzyl or phenethyl group. The above-described aralkylene group is a divalent group formed by removing one hydrogen atom from the aralkyl. Each $R_2$ is preferably an alkyl group having 1 to 4 carbon atoms, being straight or branched, particularly preferably a methyl group.

When each $R_1$ is $-(CH_2CH_2O)_p-(CH_2CH_2)_q-$, it is preferable that p is zero to 15 and/or q is 1 to 15, and it is more preferable that p is zero to 10 and/or q is 1 to 10.

When each $R_1$ is an alicyclic alkylene group or an aralkylene group, the alkylene portion in the alicyclic alkylene or aralkylene preferably has 1 to 3 carbon atoms. The alicyclic portion in the alicyclic alkylene and the aryl portion in the aralkylene may be substituted with a lower alkyl group such as methyl and ethyl, and so on.

When each $R_1$ is a cycloalkylene group or an arylene group, it may be substituted with a lower alkyl group such as methyl and ethyl, and so on.

When each $R_2$ is an aralkyl group, the alkylene portion in the aralkyl group preferably has 1 to 3 carbon atoms. The aryl portion in the aralkyl group may be substituted with a lower alkyl group such as methyl and ethyl, and so on.

When each $R_2$ is an aryl group, it may be substituted with a lower alkyl group such as methyl and ethyl, and so on.

The average degree of polymerization, n, is 1 to 50, preferably 1 to 30, particularly preferably 2 to 18.

When the number of carbon atoms in $R_1$ exceeds 24 and n is larger than 50, the resultant tertiary aminoalcohol(s) has an increased molecular weight and an increased viscosity depending upon the number of carbon atoms and structure of $R_2$. On the other hand, when the number of carbon atoms of $R_1$ is smaller than 2 and n is smaller than 1, the content of the tertiary amino group in the molecular skeleton becomes so low that no expected catalytic property can be obtained.

In the general formula (II), each $R_3$ is an alkylene group having 2 to 24 carbon atoms, being straight or branched, a cycloalkylene group having 3 to 24 carbon atoms, an alicyclic alkylene group having 4 to 24 carbon atoms and having 1 to 6 carbon atoms in the alkylene portion, an arylene group having 6 to 24 carbon atoms, an aralkylene group having 7 to 24 carbon atoms and having 1 to 6 carbon atoms in the alkylene portion, or $-(CH_2CH_2O)_p-(CH_2CH_2)_q-$, p being zero or a positive number, q being a positive number, preferably a straight-chain or branched alkylene group having 6 to 9 carbon atoms. Each $R_4$ is an alkyl group having 1 to 24 carbon atoms, being straight or branched, an aryl group having 6 to 24 carbon atoms or an aralkyl group having 7 to 24 carbon atoms and having 1 to 6 carbon atoms in the alkylene portion. Each $R_4$ is preferably an alkyl group having 1 to 4 carbon atoms, being straight or branched, particularly preferably a methyl group.

When each $R_3$ is $-(CH_2CH_2O)_p-(CH_2CH_2)_q-$, it is preferable that p is zero to 15 and/or q is 1 to 15, and it is more preferable that p is zero to 10 and/or q is 1 to 10.

When each $R_3$ is an alicyclic alkylene group or an aralkylene group, the alkylene portion of the alicyclic alkylene or an aralkylene group preferably has 1 to 3 carbon atoms. The alicyclic portion in the alicyclic alkylene group and the aryl portion in the aralkylene group may be substituted with a lower alkyl group such as methyl and ethyl, and so on.

When each $R_3$ is a cycloalkylene group or an arylene group, it may be substituted with a lower alkyl group such as methyl and ethyl, and so on.

When each $R_4$ is an aralkyl group, the alkylene portion of the aralkyl group has 1 to 3 carbon atoms preferably. The aryl portion in the aralkyl group may be substituted with a lower alkyl group such as methyl and ethyl, and so on.

When each $R_4$ is an aryl group, it may be substituted with a lower alkyl group such as methyl and ethyl, and so on.

The average degree of polymerization, m, is 1 to 50, preferably 1 to 30, particularly preferably 2 to 18.

When the number of carbon atoms in $R_3$ exceeds 24 and m is larger than 50, the resultant tertiary aminoalcohol(s) has an increased molecular weight and an increased viscosity depending upon the number of carbon atoms and structure of $R_4$. On the other hand, when the number of carbon atoms of $R_3$ is smaller than 2 and n is smaller than 1, the content of the tertiary amino group in the molecular skeleton becomes so low that no expected catalytic property can be obtained.

Thus, the selection of the content of the tertiary amino group in the molecular skeleton, molecular weight, and the molecular weight and structure of the side chain in such a range as to satisfy the performance requirement of the polyol gives tertiary aminoalcohols represented by the general formula (I) having various catalytic properties in conformity with the required reactivity, so that it becomes possible to produce a rigid polyurethane foam having desirable properties substantially without the necessity for using any catalyst component.

The selection of the content of the tertiary amino group in the molecular skeleton, molecular weight, and the molecular weight and structure of the side chain gives tertiary aminoalcohols represented by the general formula (II) having various catalytic properties in conformity with the required reactivity, so that it becomes possible to produce a rigid polyurethane foam having desirable properties substantially without the necessity for using any catalyst component.

In the present invention, the tertiary aminoalcohol represented by the general formula (I) may be used as a mixture containing two or more tertiary aminoalcohols represented by the general formula (I), and, similarly, the tertiary aminoalcohol represented by the general formula (II) may be used as a mixture containing two or more tertiary aminoalcohols represented by the general formula (II).

In the present invention, the tertiary amino alcohol represented by the general formula (I) may be used as a polyols component together with other polyol in any arbitrary proportion. Generally known polyester polyols, polyether polyols, etc., used for the production of polyurethane foam may be used as the polyol component with the tertiary amino alcohol represented by the general formula (I). Examples thereof include ordinary polyester polyols produced from a dibasic acid and a polyhydric alcohol and polyether polyols prepared by adding ethylene oxide and/or propylene oxide to a glycol such as ethylene glycol or propylene glycol, a polyhydric alcohol such as glycerol, pentaerythritol, trimethylolpropane, sorbitol or sucrose, and ammonia, triethanolamine or aniline or a polyamine such as ethylenediamine, diethylenetriamine, aminoethylpiperazine, triethylenediamine, 1,3-propandeiamine or isophoronediamine. The above-described polyols may be used alone or in the form of a mixture of two or more of them.

The combined use of a compound selected from among polyhydric alcohols having a hydroxyl value of 1000 or more as the polyol component, and a compound selected from aliphatic amines and aromatic amines serves to provide a rigid polyurethane foam excellent in mold filling as well as in the thermal insulation and low temperature dimensional stability.

Examples of the polyhydric alcohol include aromatic amine polyols, sugar-type polyether polyols and glycerol-type polyether polyols. Ethylene glycol and glycerol are particularly preferred. The amount of use of the polyfunctional alcohols is preferably 1 to 50% by weight based on the whole amount of the polyol component.

In the present invention, the tertiary aminoalcohol represented by the general formula (I) is used as part or the whole of the polyol component, and may be used in combination with other polyols in any proportion. The amount of use of the tertiary aminoalcohol is preferably 1 to 50% by weight, still more preferably 1 to 30% by weight based on the whole amount of the polyol component.

Examples of the polyisocyanate compound useable in the present invention include aromatic, aliphatic and alicyclic polyisocyanates having two or more isocyanate groups, mixtures of two or more of them, and modified polyisocyanates prepared by modifying these compounds. More specific examples thereof include polyisocyanates such as tolylene diisocyanate, diphenylmethane diisocyanate, polymethylene polyphenyl polyisocyanate (crude MDI), xylylene diisocyanate, isophorone diisocyanate and hexamethylene diisocyanate, and modified polyisocyanates thereof, for example, carbodiimide-modified products, biuret-modified products, dimers and trimers, and further isocyanate-terminated prepolymers prepared from the above-described polyisocyanate and a compound having active hydrogen(s).

The foaming agent is at least one selected from the group consisting of water, trichlorofluoromethane, 1,1-dichloro-2,2,2-trifluoroethane and 2,2-dichloro-2-fluoroethane preferably. In particular, in the case of the production of a flexible polyurethane foam, water is used as the foaming agent. If necessary, methylene chloride, pentane, n-hexane, etc., may be used in combination with the foaming agent for the purpose of reducing the amount of use of trichlorofluoromethane.

In the present invention, in addition to the above-described polyisocyanate component and polyol component, catalysts, surfactants and/or foam stabilizers, colorants, fire retardants and stabilizers may be used according to need. The kind and amount of addition of the additives may be those commonly used in the art.

Although the use of the tertiary aminoalcohol represented by the general formula (I) according to the present invention as the whole or at least part of the polyol component makes it substantially unnecessary to use the catalyst component, it is also possible to use a conventional catalyst for the purpose of further enhancing the moldability and workability, depending upon the applications. There is no particular limitation on the catalyst used for this purpose, and conventional amine catalysts and metallic catalysts may be used. These catalysts may be used alone or in the form of a mixture of two or more of them in combination with the tertiary aminoalcohol represented by the general formula (I).

Further, in the present invention, a crosslinking agent can be used according to need. Examples of the crosslinking agent include monomeric glycols such as ethylene glycol, propylene glycol, diethylene glycol and 1,4-butanediol, alkanolamines such as diethanolamine and triethanolamine, aliphatic polyamines such as ethylenediamine and diethylenetriamine, and aromatic diamines such as 4,4-diphenylmethanediamine.

In the process for producing the polyurethane according to the invention, A mixture which includes above-mentioned polyol component as main component and B mixture which includes above-mentioned polyisocyanate compound as main component, are mixed and reacted. Other components, except for the polyol component and the isocyanate compound, are included in A mixture or B mixture. The reaction conditions are not limited.

In the process for producing the polyurethane foam according to the invention, A mixture, which includes the above-mentioned polyol component as the main component, and B mixture, which includes the above-mentioned polyisocyanate compound as the main component, are mixed and reacted. The foaming agent is included in A mixture or B mixture, preferably in A mixture. Other components, except for the polyol component and the isocyanate compound, are included in A mixture or B mixture. The reaction conditions are not limited.

In the process for producing the spray type rigid polyurethane foam according to the invention, A mixture which includes the above-mentioned polyol component as main component and B mixture which includes above-mentioned polyisocyanate compound as the main component are mixed, sprayed and reacted. The foaming agent is included in A mixture or B mixture, preferably in A mixture. Other components except for the polyol component and the isocyanate compound are included in A mixture or B mixture. The reaction conditions are not limited.

EXAMPLES

The present invention will now be described in more detail with reference to the following Examples, though it is not limited to these Examples only. In the Examples, "part" is by weight unless otherwise specified.

<Production Examples of Tertiary Aminoalcohol>

REFERENTIAL EXAMPLE A

A 1-l flask equipped with a condenser and a separator for formed water was charged with 600 g of 1,6-hexanediol and 24 g (4% by weight based on diol) of a Cu/Ni/Pd catalyst and purged with nitrogen while stirring, and heating was started. When the temperature in the system reached 100° C., hydrogen gas was blown into the system at a flow rate of 10 l/hr (by flow meter) and the temperature was then raised to 180° C. At that temperature, a gaseous mixture of monomethylamine and hydrogen was blown into the system at a flow rate of 40 l/hr. The progress of the reaction was traced by the amine value and the hydroxyl value. The reaction was conducted for 4 hr. After the completion of the reaction, the catalyst was separated by filtration to give a viscous liquid having a light brown color.

REFERENTIAL EXAMPLE B

A reaction was conducted for 4 hr under the same condition as that of the Referential Example A, except that the blowing flow rate of hydrogen and that of the gaseous mixture of monomethylamine with hydrogen were 5 l/hr and 35 l/hr, respectively.

REFERENTIAL EXAMPLE C

A reaction was conducted for 40 hr under the same condition as that of the Referential Example B, except that n-butylamine was used as the amine, the reaction temperature was 185° C. and n-butylamine was added in drops to the reaction system.

REFERENTIAL EXAMPLE D

A reaction was conducted for 30 hr under the same condition as that of the Referential Example B, except that benzylamine was used as the amine to be added at once to the reaction system.

REFERENTIAL EXAMPLE E

A reaction was conducted for 8 hr under the same condition as that of the Referential Example B, except that the reaction temperature was 210° C., 1,9-nonanediol was used as the alcohol and the catalyst was used in an amount of 2% by weight.

REFERENTIAL EXAMPLE F

A reaction was conducted for 8 hr under the same condition as that of the Referential Example B, except that the reaction temperature was 210° C. and triethylene glycol was used as the alcohol.

The properties of the tertiary aminoalcohols prepared in the Referential Examples A to F are given in Table 1.

50 ml of a 0.1533 mol/l benzene solution of each of the tertiary aminoalcohols listed in Table 1 and 50 ml of 0.1533 mol/l benzene solution of TDI-100 (NCO/OH molar ratio: 1.05) (a product of Mitsui Toatsu Chemicals, Inc.) were put in a 200 ml-conical flask equipped with a ground stopper and the flask was allowed to stand in a thermostatic chamber at 30° C. to conduct a reaction. The reaction was traced based on the percentage reduction of the concentration of the isocyanate group in the reaction system. Specifically, sampling was conducted with a 10-ml pipette every one hour until 4 hr after the initiation of the reaction. The reaction mixture was added to 5 ml of a 25 g/l n-butylamine-dioxane solution and the mixture was sufficiently shaken and titrated with a 0.2N hydrochloric acid-alcohol solution. The concentration of the isocyanate group remaining in the reaction mixture was determined from the difference between the amount of the consumed hydrochloric acid and the amount of hydrochloric acid consumed in 5 ml of a blank solution.

In this case, when the concentration of the isocyanate group reduced by the reaction is expressed by Y, 1/Y is proportional to the reaction time, t. The 1/Y value two hr after the initiation of the reaction is given in Table 2.

Figure 1:
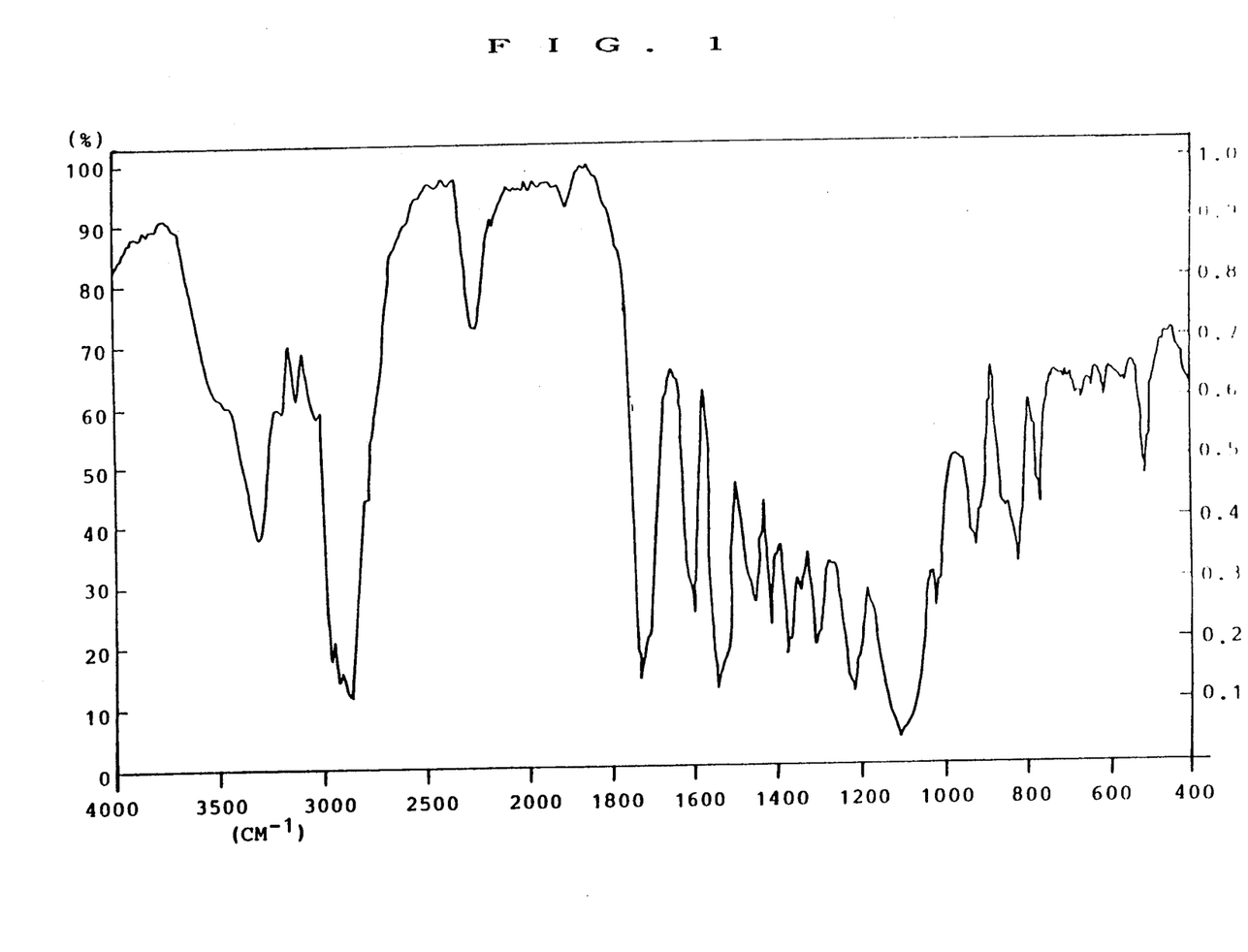
FIG. 1 is a chart showing an infrared absorption spectrum of a polyurethane prepared in Example 1.

An infrared absorption spectrum of polyurethane produced in Example 1 is shown in FIG. 1.

TABLE 1

| tert. amino-alcohol | A | B | C | D | E | F |
|---|---|---|---|---|---|---|
| $-R_1-$, $-R_3-$* | $-C_6H_{12}-$ | $-C_6H_{12}-$ | $-C_6H_{12}-$ | $-C_6H_{12}-$ | $-C_9H_{10}-$ | $-(C_2H_4O)_2(C_2H_4)-$ |
| $-R_2$, $-R_4$* | $-CH_3$ | $-CH_3$ | $-C_4H_9$ | $-CH_2-C_6H_5$ | $-CH_3$ | $-CH_3$ |
| formula (I) | | | | | | |
| n | 4.1 | 3.8 | 9.2 | 3.9 | 13.5 | 3.3 |
| average molecular weight | 580 | 550 | 1550 | 850 | 2260 | 560 |
| formula (II) | | | | | | |
| m | — | 3.5 | 8.0 | 3.5 | 11.5 | 3.0 |
| average molecular weight | — | 430 | 1320 | 770 | 1750 | 430 |
| (I)/(II) molar ratio | 100/0 | 90/10 | 95/5 | 90/10 | 98/2 | 90/10 |

Note:
*$R_1$, $R_2$, $R_3$ and $R_4$ groups are those of a tertiary amino alcohol represented by the formula (I) or (II). The molecular weight is a value determined by the conventional gel permeation chromatography.

EXAMPLES 1 TO 8 AND COMPARATIVE EXAMPLES 1 AND 2

The reactivities of the tertiary aminoalcohols A to E according to the present invention, comparative general-purpose polyol and mixtures of the tertiary aminoalcohol according to the present invention and comparative general-purpose polyol were measured by the following method.

TABLE 2

| | | | Ex. No. | | | | | | | | Comp. Ex. No. | |
|---|---|---|---|---|---|---|---|---|---|---|---|---|
| | | | 1 | 2 | 3 | 4 | 5 | 6 | 7 | 8 | 1 | 2 |
| compo- | tert. | A | 100 | 50 | 10 | | | | | | | |
| nent | amino- | B | | | | 100 | | | | | | |
| (pt. | alcohol | C | | | | | 100 | | | | | |
| by | | C | | | | | | 100 | | | | |
| (wt.) | | D | | | | | | | 100 | | | |
| | | E | | | | | | | | 100 | | |
| | general-purpose polyol*1 | | | 50 | 90 | | | | | | 100 | 100 |
| | catalyst*2 | | | | | | | | | | | 2 |
| 1/Y | | | 158 | 80 | 25 | 160 | 40 | 30 | 135 | 80 | 14 | 22 |

Note)
*1: Exenol 2020, a product of Asahi Glass Co., Ltd.
*2: N,N,N,N-tetramethylhexamethylenediamine (Kao Lizer No. 1), a product of Kao Corp.

EXAMPLES 9 TO 16 AND COMPARATIVE EXAMPLES 3 AND 4

The panel filling property when polyurethane foams were molded through the use of each of the tertiary aminoalcohols A to F according to the present invention and general-purpose polyol A was measured by the following method.

Starting materials for the production of a polyurethane foam were mixed with each other according to the formulation specified in Table 3, and urethane foaming was conducted by a conventional procedure. Specifically, each of the polyols, water, a surfactant, a catalyst (N,N,N,N-tetramethylhexamethylenediamine, Kao Lizer No. 1), a foaming agent and a polyisocyanate which were kept at 20° C. were mixed with each other, and the mixture was stirred and poured into a panel for measuring the panel filling to mold a polyurethane foam.

The following polyol mixture was used as the general-purpose polyol A:

| | |
|---|---|
| aromatic polyether polyol (OHV:450), a product of Asahi Olin Ltd. | 70 parts |
| sugar polyether polyol (OHV:530), a product of Sumitomo Bayer Urethane Co., Ltd. | 20 parts |
| glycerin polyether polyol (OHV:235), a product of Mitsui Toatsu Chemical. Inc. | 10 parts |

The panel was used after adjusting the temperature of an inverted L-shaped panel having a size of 450×500×35 mm (vertical part) and 450×450×35 mm (horizontal part) to 40° C.

The cream time (hereinafter referred to as "CT") and gel time (hereinafter referred to as "GT") in the molding of a polyurethane foam and the panel filling property of the polyurethane form were evaluated. The term "CT" used herein is intended to mean a time taken from the initiation of the stirring to the initiation of the foaming reaction, while the term "GT" a time taken for the resin to elongate in stringy form when a tip of a sharp-edged material is brought into contact with the surface of the urethane foam and then separated therefrom.

The panel filling property is expressed by the length (cm) of the molded article when a given amount (350 g) of stirred urethane starting materials is poured into the panel.

The results are given in Table 3.

TABLE 3

| | | | Ex. No. | | | | | | | | Comp. Ex. No. | |
|---|---|---|---|---|---|---|---|---|---|---|---|---|
| | | | 9 | 10 | 11 | 12 | 13 | 14 | 15 | 16 | 3 | 4 |
| compo-nent (pt. by wt.) | tert. amino- alcohol | A | 20 | 10 | 5 | | | | | | | |
| | | B | | | | 10 | | | | | | |
| | | C | | | | | 10 | | | | | |
| | | D | | | | | | 10 | | | | |
| | | E | | | | | | | 10 | | | |
| | | F | | | | | | | | 10 | | |
| | polyol A | | 80 | 90 | 95 | 90 | 90 | 90 | 90 | 90 | 100 | 100 |
| | water | | 1.5 | 1.5 | 1.5 | 1.5 | 1.5 | 1.5 | 1.5 | 1.5 | 1.5 | 1.5 |
| | R-123*1 | | 50 | ← | ← | ← | ← | ← | ← | ← | ← | ← |
| | L-5340*2 | | 2 | ← | ← | ← | ← | ← | ← | ← | ← | ← |
| | catalyst | | — | ← | ← | ← | ← | ← | ← | ← | 3 | 4 |
| | C-MDI*3 | | index 105 | ← | ← | ← | ← | ← | ← | ← | ← | ← |
| reac-tivity | CT | | 7 | 9 | 13 | 9 | 11 | 13 | 13 | 10 | 12 | 9 |
| | GT | | 35 | 40 | 52 | 38 | 46 | 54 | 55 | 52 | 57 | 45 |
| | panel filling | | 76 | 76 | 76 | 76 | 75 | 76 | 76 | 78 | 71 | 69 |

Note)
*1: silicone surfactant (a product of Nippon Unicar Co., Ltd.),
*2: 1,1,1-trifluorodichloroethane.
*3: Crude MDI, a product of Mitsui Toatsu Chemicals, Inc.)

EXAMPLES 17 TO 27 AND COMPARATIVE EXAMPLES 5 TO 9

Rigid polyurethane foams were produced and their foaming properties were evaluated. Each formulation specified in Table 4 and other components (a foam stabilizer and a polyisocyanate component) were mixed and urethane foaming was conducted by a conventional procedure. In this case, 1.5 parts of L-5340, a product of Nippon Unicar Co., Ltd., was used as a foam stabilizer, while a mixture of tetramethylhexamethylenediamine (Kao Lizer No. 1), a product of Kao Corp., with pentamethyldiethylenetriamine (Kao Lizer No. 3) in a weight ratio of 3:1 was used as a catalyst. TR-50BX (wt. % of isocyanate: 30.7) was used in an NCO to OH ratio of 1.05 as the polyisocyanate component.

The free density and mold filling property were measured by the following method:

(1) free density: density obtained when the foaming was conducted in a veneer mold having an internal dimension of 150×150×200 mm, kg/m³.

(2) mold filling: length of a molded article obtained when 350 g of the starting material was poured into an inverted L-shaped aluminus mold having a temperature adjusted to 40° C., cm/350 g.

The results are given in Table 4.

TABLE 4

| Formulation | | Comp. Ex. No. | | | | | Ex. No. | | | | | | | | | | | |
|---|---|---|---|---|---|---|---|---|---|---|---|---|---|---|---|---|---|---|
| | | 5 | 6 | 7 | 8 | 9 | 17 | 18 | 19 | 20 | 21 | 22 | 23 | 24 | 25 | 26 | 27 |
| polyol A | | 100 | 100 | 100 | 100 | 100 | 90 | 80 | 90 | 60 | 70 | 90 | 80 | 90 | 90 | 90 | 90 |
| tert. amino-alcohol | A | | | | | | 10 | 20 | | | | | | | | | |
| | B | | | | | | | | 10 | | | | | | | | |
| | C | | | | | | | | | 40 | | | | | | | |
| | D | | | | | | | | | | 30 | | | | | | |
| | E | | | | | | | | | | | 10 | | | | | |
| | F | | | | | | | | | | | | 20 | | | | |
| foaming | water | 1.5 | 1.5 | 4.0 | 2.7 | 1.5 | 1.5 | 1.5 | 1.5 | 1.5 | 1.5 | 1.5 | 1.5 | 4.0 | 1.5 | 2.7 | 1.5 |

TABLE 4-continued

| Formulation | | Comp. Ex. No. | | | | | Ex. No. | | | | | | | | | | |
|---|---|---|---|---|---|---|---|---|---|---|---|---|---|---|---|---|---|
| | | 5 | 6 | 7 | 8 | 9 | 17 | 18 | 19 | 20 | 21 | 22 | 23 | 24 | 25 | 26 | 27 |
| agent | R-11* | 40 | 40 | 20 | | | 40 | 40 | 40 | 40 | 40 | 40 | 40 | 40 | 20 | | | |
| | R-123* | | | | 40 | | | | | | | | | | | 48 | 40 | |
| | R-141b** | | | | | 35 | | | | | | | | | | | | 35 |
| catalyst | | 2 | 1.8 | 2 | 3 | 2 | | | | | | | | | | | | |
| free density (kg/m³) | | 22.5 | 21.0 | 23.2 | 22.1 | 22.5 | 22.6 | 22.0 | 22.8 | 22.7 | 22.9 | 22.0 | 23.0 | 23.9 | 22.3 | 21.8 | 22.0 |
| mold filling (cm) | | 80 | 84 | 75 | 70 | 70 | 85 | 88 | 86 | 84 | 84 | 85 | 87 | 79 | 81 | 78 | 75 |

Note)
*trichlorofluoromethane
**2,2-dochloro-2-fluoroethane

EXAMPLES 28 TO 55 AND COMPARATIVE EXAMPLES 10 TO 17

Rigid polyurethane foams were produced and their properties were evaluated. Starting materials for the production of a polyurethane foam, each formulation specified in Tables 5 and 6 and a polyisocyanate component TR-50BX (wt. % of isocyanate: 30.7), were mixed and urethane foaming was conducted by a conventional procedure. Specifically, polyol component(s), a foaming agent, a foam stabilizer, a catalyst and a polyisocyanate were mixed with each other, stirred and poured into a mold having a size of 20×20×5 cm and kept at 40° C., and demolding was conducted 10 min after the pouring to prepare a rigid polyurethane foam, which was used as a sample for various evaluations.

Each rigid polyurethane foam thus prepared was stored at −30° C. for 24 hr to measure the percentage dimensional change. Further, the foam was cut into a size of 18×18×2.5 cm to measure the thermal conductivity. In the Tables 5 and 6, the amount of resin breakage refers to the amount of a resin determined in the measurement of the friability as one measure of the adhesiveness by the following method. Stirred rigid polyurethane foam starting materials were poured into the above-described mold kept at 40° C., and demolded 5 min after pouring, and the measured amount of the resin adhering to the mold was defined as the amount of resin breakage. The results are given in Tables 5 and 6.

In this case, the general-purpose polyol A used was the same as in Table 3. 1.5 parts of L-5340, a product of Nippon Unicar Co., Ltd., was used as a foam stabilizer, while tetramethylhexamethylenediamine (Kao Lizer No. 1), a product of Kao Corp., was used as a catalyst in an amount specified in Tables 5 and 6. TR-50BX (wt. % of isocyanate: 30.7), a product of Mitsui Toatsu Chemicals, Inc., was used in an NCO to OH ratio of 1.05 as the polyisocyanate component. The glycerin used as a polyol component was a purified one (OHV: 1830), a product of Kao Corp. The tolylenediamine (toluylenediamine) used as an aromatic amine was a product of Mitsui Toatsu Chemicals, Inc. The triethanolamine used as an aliphatic amine was a product of Mitsui Toatsu Chemicals, Inc.

TABLE 5

| | Comp. Ex. No. | | | | Ex. No. | | | | | | | | | | | | |
|---|---|---|---|---|---|---|---|---|---|---|---|---|---|---|---|---|---|
| | 10 | 11 | 12 | 13 | 28 | 29 | 30 | 31 | 32 | 33 | 34 | 35 | 36 | 37 | 38 | 39 | 40 | 41 |
| starting material compsn. (pt. by wt.) | | | | | | | | | | | | | | | | | | |
| tert. aminoalcohol | | | | | | | | | | | | | | | | | | |
| A | | | 10 | | 10 | 20 | | | | | | | 10 | 60 | 10 | 10 | 10 | 10 |
| B | | | | | | | 10 | | | | | | | | | | | |
| C | | | | | | | | 15 | | | | | | | | | | |
| D | | | | | | | | | 30 | | | | | | | | | |
| E | | | | | | | | | | 40 | | | | | | | | |
| F | | | | | | | | | | | 50 | | | | | | | |
| polyol A | 100 | 100 | 90 | 90 | 80 | 70 | 80 | 75 | 60 | 50 | 40 | 70 | 30 | 50 | 80 | 85 | 80 | 80 |
| glycerin | | | | 10 | 10 | 10 | 10 | 10 | 10 | 10 | 10 | 10 | 20 | 10 | 40 | 5 | | 5 |
| tolylenediamine | | | | | | | | | | | | | | | | 5 | 5 | |
| triethanolamine | | | | | | | | | | | | | | | | | 10 | 5 |
| Kao Lizer No. 1 | 3 | 3 | | | | | | | | | | | | | | | | |
| foaming agent (L-5340) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| R-11 | 40 | | | | | | | | | | | | | | | | | |
| R-123 | | 48 | 48 | 48 | 48 | 48 | 48 | 48 | 48 | 48 | 48 | 48 | 48 | 48 | 48 | 48 | 48 | 48 |
| property of foam | | | | | | | | | | | | | | | | | | |
| density (kg/m³) | 38.0 | 39.1 | 39.2 | 39.3 | 39.0 | 40.0 | 39.5 | 39.9 | 39.1 | 38.0 | 39.7 | 39.5 | 39.0 | 38.8 | 39.0 | 38.8 | 39.1 | 39.9 |
| thermal conductivity × $10^{-4}$ (kcal/hm° C.) | 130 | 145 | 140 | 141 | 135 | 134 | 135 | 135 | 133 | 134 | 133 | 133 | 133 | 132 | 133 | 134 | 133 | 133 |
| low temp. dimensional stability (%; −30° C., | −1.5 | −38.4 | −43.1 | −1.0 | −1.5 | −1.8 | −1.3 | −1.9 | −2.0 | −2.2 | −2.4 | −0.5 | −3.5 | −0.4 | −2.0 | −2.9 | −3.1 | −2.5 |

TABLE 5-continued

| | Comp. Ex. No. | | | | Ex. No. | | | | | | | | | | | | | |
|---|---|---|---|---|---|---|---|---|---|---|---|---|---|---|---|---|---|---|
| | 10 | 11 | 12 | 13 | 28 | 29 | 30 | 31 | 32 | 33 | 34 | 35 | 36 | 37 | 38 | 39 | 40 | 41 |
| 24 hr) amt. of resin breakage (g; 40° C., 5 min) | 0.2 | 0.1 | 0.1 | 0.2 | 0.2 | 0.2 | 0.2 | 0.2 | 0.2 | 0.1 | 0.1 | 0.4 | 0.0 | 1.0 | 1.0 | 1.1 | 0.5 | 0.6 |

TABLE 6

| | Comp. Ex. No. | | | | Ex. No. | | | | | | | | | | | | | |
|---|---|---|---|---|---|---|---|---|---|---|---|---|---|---|---|---|---|---|
| | 14 | 15 | 16 | 17 | 42 | 43 | 44 | 45 | 46 | 47 | 48 | 49 | 50 | 51 | 52 | 53 | 54 | 55 |
| starting material compsn. (pt. by wt.) | | | | | | | | | | | | | | | | | | |
| tert. aminoalcohol | | | | | | | | | | | | | | | | | | |
| A | | 10 | | | 10 | 20 | | | | | | 10 | 60 | 10 | 10 | 10 | 10 | 10 |
| B | | | | | | | 10 | | | | | | | | | | | |
| C | | | | | | | | 15 | | | | | | | | | | |
| D | | | | | | | | | 30 | | | | | | | | | |
| E | | | | | | | | | | 40 | | | | | | | | |
| F | | | | | | | | | | | 50 | | | | | | | |
| polyol A | 100 | 100 | 90 | 90 | 80 | 70 | 80 | 75 | 60 | 50 | 40 | 70 | 30 | 50 | 80 | 85 | 80 | 80 |
| glycerin | | | | 10 | 10 | 10 | 10 | 10 | 10 | 10 | 10 | 10 | 20 | 10 | 40 | 5 | | 5 |
| tolylenediamine | | | | | | | | | | | | | | | | 5 | | |
| triethanolamine | | | | | | | | | | | | | | | | | 10 | 5 |
| Kao Lizer No. 1 | 3 | 3 | | | | | | | | | | | | | | | | |
| foaming agent (L-5340) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| water | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| R-11 | 40 | | | | | | | | | | | | | | | | | |
| R-123 | | 48 | 48 | 48 | 48 | 48 | 48 | 48 | 48 | 48 | 48 | 48 | 48 | 48 | 48 | 48 | 48 | 48 |
| property of foam | | | | | | | | | | | | | | | | | | |
| density (kg/m$^3$) | 24.0 | 24.1 | 24.3 | 23.5 | 24.1 | 25.1 | 24.1 | 24.3 | 24.0 | 23.7 | 23.9 | 24.4 | 24.8 | 24.3 | 23.9 | 24.3 | 24.1 | 24.0 |
| thermal conductivity × 10$^{-4}$ (kcal/hm° C.) | 137 | 153 | 148 | 146 | 141 | 140 | 141 | 140 | 139 | 139 | 138 | 139 | 138 | 139 | 140 | 141 | 141 | 139 |
| low temp. dimensional stability (%; −30° C., 24 hr) | −0.6 | −23.0 | −28.1 | −0.5 | −0.7 | −0.9 | −0.9 | −1.1 | −1.2 | −1.4 | −1.5 | −0.3 | −1.9 | −0.3 | −2.0 | −3.0 | −3.5 | −2.0 |
| amt. of resin breakage (g; 40° C., 5 min) | 0.5 | 0.3 | 0.3 | 0.3 | 0.4 | 0.4 | 0.5 | 0.5 | 0.4 | 0.3 | 0.2 | 0.8 | 0.1 | 2.9 | 2.4 | 2.0 | 0.8 | 0.9 |

EXAMPLES 56 TO 61

Starting materials for the production of a polyurethane foam, each formulation specified in Table 7 and a polyisocyanate component TR-50BX (wt. % of isocyanate: 30.7), were mixed, and urethane foaming was conducted in the same manner as that described above to give a rigid polyurethane foam. Each of the rigid polyurethane foams was used as the sample for various evaluations. The results are given in Table 7.

In Table 7, polyol A and L-5340 were the same as those described above. Ethylene glycol used as a polyol component was a first-grade reagent (OHV: 1810) of Katayama Chemical Industry Corp./1,6-Hexanediamine was a first-grade reagent of Katayama Chemical Industry Corp. TR-50BX (wt. % of isocyanate: 30.7), a product of Mitsui Toatsu Chemicals, Inc., was used in an NCO to OH ratio of 1.05 as the polyisocyanate component.

TABLE 7

| | Ex. No. | | | | | |
|---|---|---|---|---|---|---|
| | 56 | 57 | 68 | 59 | 60 | 61 |
| starting material compsn. (pt. by wt.) | | | | | | |
| tert. aminoalcohol | | | | | | |
| A | 10 | | 10 | 10 | | |
| B | | 10 | | | | |
| C | | | 10 | | | |
| D | | | | 10 | | |
| E | | | | | 20 | |
| F | | | | | | 30 |
| polyol A | 80 | 75 | 65 | 65 | 65 | 57 |
| ethylene glycol | 10 | 10 | 10 | 10 | 10 | 10 |
| 1,6-hexanediamine | 0 | 5 | 5 | 5 | 5 | 3 |
| foaming agent (L-5340) | 1.5 | 1.5 | 1.5 | 1.5 | 1.5 | 1.5 |
| water | 1.5 | 1.5 | 1.5 | 1.5 | 1.5 | 1.5 |
| R-123 | 48 | 48 | 48 | 48 | 48 | 48 |
| property of foam | | | | | | |
| density (kg/m$^3$) | 24.2 | 24.9 | 24.8 | 24.3 | 24.3 | 25.5 |

TABLE 7-continued

|  | Ex. No. | | | | | |
|---|---|---|---|---|---|---|
|  | 56 | 57 | 68 | 59 | 60 | 61 |
| thermal conductivity × $10^{-4}$ (kcal/hm° C.) | 141 | 141 | 140 | 142 | 141 | 141 |
| low temp. dimensional stability (%; −30° C., 24 hr) | −1.3 | −1.4 | −2.0 | −2.1 | −0.5 | −.07 |
| amt. of resin breakage (g; 40%, 5 min) | 0.3 | 0.4 | 0.3 | 0.4 | 0.4 | 0.4 |

COMPARATIVE EXAMPLES 18 AND 19

Foaming was conducted by the following method according to each formulation of the conventional spray type rigid polyurethane foam as specified in Table 8.

Among the blending materials listed in the Table 8, the starting materials except for Crude MDI were preliminarily mixed with each other and kept at 5° C., and Crude MDI adjusted to a temperature of 5° C. was reacted with a predetermined amount of the preliminarily mixed components (mixture of the starting materials except for Crude MDI) by hand mixing foaming to measure the reaction rate (CT, GT and RT) and mechanical properties of the resultant foams.

The self adhesive bonding strength was measured according to the method prescribed in JIS A 9526. Specifically, a sample was prepared by preliminarily mixing starting materials except for Crude MDI with each other and maintaining the mixture at 5° C., subjecting the Crude MDI adjusted to a temperature of 5° C. and a specified amount of the preliminarily mixed components to hand mixing, applying the liquid mixture to a veneer kept at 5° C., and subjecting the resulting coating to foam curing. The environmental temperature in the foaming process was maintained at 5° C.

The results are given in Table 9.

EXAMPLES 62 TO 65

Foaming was conducted according to each formulation specified in Table 8 in the same manner as that of the Comparative Examples 18 and 19 through the use of the tertiary aminoalcohols A and B of the present invention prepared in the Referential Examples to measure various properties of the polyurethane foams.

The results are given in Table 9.

EXAMPLE 66 AND COMPARATIVE EXAMPLE 20

A foaming test was conducted at a low temperature (0° C.). The foaming was conducted under the same condition as that of the Comparative Example 18 and Example 54. The temperature of the starting materials was kept at 0° C., and the temperature of the sample for the self adhesive bonding strength and the room temperature as well were kept at 0° C. The results are given in Table 9.

TABLE 8

|  | Ex. No. | | | | | Comp. Ex. No. | | |
|---|---|---|---|---|---|---|---|---|
|  | 62 | 63 | 64 | 65 | 66 | 18 | 19 | 20 |
| general-purpose polyol B | 24 pts. | ← | ← | ← | ← | 30 | ← | ← |
| general-purpose polyol C | 56 | ← | ← | ← | ← | 70 | ← | ← |
| tert. aminoalcohol A | 20 | ← | 0 | ← | 20 | 0 | ← | ← |

TABLE 8-continued

|  | Ex. No. | | | | | Comp. Ex. No. | | |
|---|---|---|---|---|---|---|---|---|
|  | 62 | 63 | 64 | 65 | 66 | 18 | 19 | 20 |
| tert. aminoalcohol B | 0 | ← | 20 | ← | 0 | 0 | ← | ← |
| amine catalyst (Kao Lizer No. 1) | 2 | ← | ← | ← | ← | 2 | ← | ← |
| metal catalyst (lead octanoate, Pb: 25%) | 0.5 | ← | ← | ← | ← | ← | ← | ← |
| water | 3 | 6 | 3 | 6 | 3 | 3 | 6 | 3 |
| silicone foam stabilizer | 1 | ← | ← | ← | ← | ← | ← | ← |
| Flon-11 | 30 | 10 | 30 | 10 | 30 | 30 | 10 | 30 |
| Crude MDI (NCO: 31%) | index 105 | ← | ← | ← | ← | ← | ← | ← |

Note:
general-purpose polyol B: amine polyether polyol (OHV: 450)
general-purpose polyol C: sucrose polyether polyol (OHV: 450)

TABLE 9

|  | Ex. No. | | | | | Comp. Ex. No. | | |
|---|---|---|---|---|---|---|---|---|
|  | 62 | 63 | 64 | 65 | 66 | 18 | 19 | 20 |
| reaction temp. (°C.) | 5 | ← | ← | ← | 0 | 5 | ← | 0 |
| reactivity | | | | | | | | |
| CT (sec) | 5 | 4 | 5 | 4 | 6 | 5 | 4 | 6 |
| GT (sec) | 15 | 14 | 14 | 13 | 18 | 14 | 13 | 18 |
| RT (sec) | 18 | 16 | 17 | 15 | 21 | 17 | 15 | 21 |
| foam density (g/l) | 24.3 | 24.2 | 24.1 | 24.3 | 24.7 | 24.1 | 24.3 | 24.7 |
| self adhesive bonding strength (kg.f/cm$^2$) | 1.5 | 1.3 | 1.5 | 1.3 | 1.2 | 1.5 | 1.3 | 1.2 |
| compressive strength (kg/cm$^2$) | 0.8 | 0.7 | 0.8 | 0.7 | 0.7 | 0.8 | 0.7 | 0.7 |

EXAMPLES 67 TO 69

According to each formulation specified in Table 10, glycerin polyether polyol, tertiary aminoalcohols prepared in the Referential Examples, water and a silicone foam stabilizer were preliminarily mixed with each other, and the temperature of the mixture was adjusted to 25° C.

Then, stannous octanoate was added thereto and the mixture was stirred for 5 sec. TDI-80 (2,4-tolylene diisocyanate/2,6-tolylene diisocyanate: 80/20) adjusted to a temperature of 25° C. was immediately added thereto and the mixture was further stirred for 5 sec and poured into an aluminum mold having a size of 30×30×7 cm kept at 60° C. The mold was placed in an oven set at 160° C., and curing was conducted for 10 min, thereby preparing a flexible mold polyurethane foam. The results are given in Table 10.

COMPARATIVE EXAMPLE 20

According to the formulation specified in Table 10, foaming was conducted under the same conditions as those of the Example 59, except that glycerin polyether polyol alone was used as a polyol. The results are given in Table 10.

TABLE 10

|  | Ex. 67 | Ex. 68 | Ex. 69 | Comp. Ex. 20 |
|---|---|---|---|---|
| formulation (g) | | | | |
| glycerin polyether polyol (OHV:56) | 142.5 | 145.5 | 142.5 | 150 |

TABLE 10-continued

|  | Ex. 67 | Ex. 68 | Ex. 69 | Comp. Ex. 20 |
|---|---|---|---|---|
| tert. aminoalcohol A | 7.5 | 4.5 | 0 | — |
| tert. aminoalcohol B | 0 | 0 | 7.5 | — |
| water | 6.8 | 6.8 | 6.8 | 6.8 |
| silicone foam stabilizer | 2.3 | 1.5 | 2.3 | 1.5 |
| stannous octanoate | 0.1 | 0.1 | 0.1 | 0.1 |
| KL-31*[1] | — | — | — | 0.4 |
| KL-21*[2] | — | — | — | 0.4 |
| T-80*[3] | index 100 | index 100 | index 100 | index 100 |
| mold temp. during pouring (°C.) | 60 | 60 | 60 | 60 |
| state of foam |  |  |  |  |
| surface | good | good | good | peeling |
| inside | good | good | good | cracking |
| properties of foam |  |  |  |  |
| overall density (g/l) | 29.0 | 29.1 | 29.0 | 32.2 |
| hardness (F type) | 67 | 64 | 66 | 67 |
| tensile strength (kg/cm$^2$) | 1.62 | 1.58 | 1.57 | 1.52 |
| tear strength (kg/cm$^2$) | 0.75 | 0.78 | 0.76 | 0.75 |
| elongation (%) | 149 | 151 | 158 | 155 |
| permanent compression set (50%, 70° C. × 22 hr) | 4.9 | 4.8 | 4.8 | 4.5 |
| gas permeability (cc/cm$^2$/sec) | 16.7 | 15.3 | 16.0 | 11.6 |

Note)
*[1]33% solution of triethylenediamine in dipropylene glycol
*[2]N-ehtylmorpholine
*[3]tolylene diisocyante (2,4-/2,6-isomer: 80/20)

We claim:

1. A process for producing a polyurethane, comprising the step of reacting a polyisocyanate component with a polyol component, wherein said polyol component comprises, as all or part thereof, a tertiary aminoalcohol having the formula (I):

(I)

wherein each $R_1$ is selected from the group consisting of straight or branched alkylene having 2 to 24 carbon atoms, cycloalkylene having 3 to 24 carbon atoms, alicyclic alkylene having 4 to 24 carbon atoms and having 1 to 6 carbon atoms in the alkylene portion, arylene having 6 to 24 carbon atoms, aralkylene having 7 to 24 carbon atoms and having 1 to 6 carbon atoms in the alkylene portion, and —(CH$_2$CH$_2$O)$_p$—(CH$_2$CH$_2$)$_q$—, wherein p is zero or a positive number, and q is a positive number, each $R_2$ is selected from the group consisting of straight or branched alkyl having 1 to 24 carbon atoms, aryl having 6 to 24 carbon atoms, and an aralkyl having 7 to 24 carbon atoms and having 1 to 6 carbon atoms in the alkylene portion, and wherein n is a positive number of 2 to 50.

2. The process according to claim 1, wherein each $R_1$ is straight or branched alkylene having 6 to 9 carbon atoms, each $R_2$ is straight or branched alkyl having 1 to 4 carbon atoms, and n is a positive number of 2 to 30.

3. The process according to claim 1, wherein said polyol component comprises 1 to 50% by weight of said tertiary aminoalcohol having the formula (I).

4. The process according to claim 1, wherein said reacting of said polyisocyanate component with said polyol component is carried out in the presence of a third component comprising a tertiary aminoalcohol having the formula (II):

(II)

wherein each $R_3$ is selected from the group consisting of straight or branched alkylene having 2 to 24 carbon atoms, cycloalkylene having 3 to 24 carbon atoms, alicyclic alkylene having 4 to 24 carbon atoms and having 1 to 6 carbon atoms in the alkylene portion, arylene having 6 to 24 carbon atoms, aralkylene having 7 to 24 carbon atoms and having 1 to 6 carbon atoms in the alkylene portion, and —(CH$_2$CH$_2$O)$_p$—(CH$_2$CH$_2$)$_q$—, wherein p is zero or a positive number, and q is a positive number, each $R_4$ is selected from the group consisting of straight or branched alkyl having 1 to 24 carbon atoms, aryl having 6 to 24 carbon atoms, and aralkyl having 7 to 24 carbon atoms and having 1 to 6 carbon atoms in the alkylene portion, and wherein m is a positive number of 2 to 50.

5. The process according to claim 4, wherein the amount of said third component having formula (II) is 30% or less by weight, based on the total amount of said tertiary aminoalcohol having formula (I) and said tertiary aminoalcohol having formula (II).

6. The process according to claim 4, wherein each $R_3$ is straight or branched alkylene having 6 to 9 carbon atoms, each $R_4$ is straight or branched alkyl having 1 to 4 carbon atoms, and n is a positive number of 2 to 30.

7. A polyurethane produced by the process of claim 1 or 4.

8. A process for producing a polyurethane foam, comprising the step of reacting a polyisocyanate component with a polyol component in the presence of a foaming agent, wherein said polyol component comprises, as all or part thereof, a tertiary aminoalcohol having the formula (I):

(I)

wherein each $R_1$ is selected from the group consisting of straight or branched alkylene having 2 to 24 carbon atoms, cycloalkylene having 3 to 24 carbon atoms, alicyclic alkylene having 4 to 24 carbon atoms and having 1 to 6 carbon atoms in the alkylene portion, arylene having 6 to 24 carbon atoms, aralkylene having 7 to 24 carbon atoms and having 1 to 6 carbon atoms in the alkylene portion, and —(CH$_2$CH$_2$O)$_p$—(CH$_2$CH$_2$)$_q$—, wherein p is zero or a positive number, and q is a positive number, each $R_2$ is selected from the group consisting of straight or branched alkyl having 1 to 24 carbon atoms, aryl having 6 to 24 carbon atoms and aralkyl having 7 to 24 carbon atoms and having 1 to 6 carbon atoms in the alkylene portion, and wherein n is a positive number of 2 to 50.

9. The process according to claim 8, wherein each $R_1$ is straight or branched alkylene having 6 to 9 carbon atoms, each $R_2$ is straight or branched alkyl having 1 to 4 carbon atoms, and n is a positive number of 2 to 30.

10. The process according to claim 8, wherein said polyol component comprises 1 to 50% by weight of said tertiary aminoalcohol having the formula (I).

11. The process according to claim 8, wherein said reacting of said polyisocyanate component with said polyol component is carried out in the presence of a third component comprising a tertiary aminoalcohol having the formula (II):

wherein each $R_3$ is selected from the group consisting of straight or branched alkylene having 2 to 24 carbon atoms, cycloalkylene having 3 to 24 carbon atoms, alicyclic alkylene having 4 to 24 carbon atoms and having 1 to 6 carbon atoms in the alkylene portion, arylene having 6 to 24 carbon atoms, aralkylene having 7 to 24 carbon atoms and having 1 to 6 carbon atoms in the alkylene portion, and $-(CH_2CH_2O)_p-(CH_2CH_2)_q-$, wherein p is zero or a positive number, and q is a positive number, each $R_4$ is selected from the group consisting of straight or branched alkyl having 1 to 24 carbon atoms, aryl having 6 to 24 carbon atoms, and aralkyl having 7 to 24 carbon atoms and having 1 to 6 carbon atoms in the alkylene portion, and wherein m is a positive number of 2 to 50.

12. The process according to claim 11, wherein the amount of said third component having formula (II) is 30% or less by weight, based on the total amount of said tertiary aminoalcohol having formula (I) and said tertiary aminoalcohol having formula (II).

13. The process according to claim 11, wherein each $R_3$ is straight or branched alkylene having 6 to 9 carbon atoms, each $R_4$ is straight or branched alkyl having 1 to 4 carbon atoms, and n is a positive number of 2 to 30.

14. The process according to claim 8 or 11, wherein said reacting of said polyisocyanate component with said polyol component is carried out in the presence of a compound selected from the group consisting of aliphatic amines and aromatic amines.

15. The process according to claim 14, wherein the amount of said compound selected from the group consisting of aliphatic amines and aromatic amines is 1 to 30 parts by weight, based on 100 parts by weight of the total amount of said polyol component.

16. The process according to claim 8 or 11, wherein said reacting of said polyisocyanate component with said polyol component is carried out in the presence of one or more compounds selected from the group consisting of triethanolamine, tolylenediamine and a diamine compound represented by formula (III):

wherein $R_5$ is straight or branched alkylene having 2 to 8 carbon atoms.

17. The process according to claim 8 or 11, wherein said foaming agent is selected from the group consisting of $H_2O$, 1,1-dichloro-2,2,2-trifluoroethane, and 2-dichloro-2-trifluoroethane.

18. The process according to claim 8 or 11, wherein said polyurethane foam is a rigid polyurethane foam.

19. The process according to claim 18, wherein said polyol component further comprises a polyol having an OH value of 1000 or above.

20. The process according to claim 18, wherein said polyol component further comprises ethyleneglycol, glycerol, or mixtures thereof.

21. The process according to claim 18, wherein the average OH value of said polyol component is 300 or above.

22. The process according to claim 8 or 11, wherein said polyurethane foam is a flexible polyurethane foam.

23. The process according to claim 22, wherein the average OH value of said polyol component is 200 or below.

24. The process according to claim 22, wherein said foaming agent is $H_2O$, and wherein said foaming agent is used in an amount of 2 to 8 parts by weight, based on 100 parts by weight of the total amount of said polyol component.

25. A process for producing a polyurethane foam by the spray method, comprising the step of spraying a mixture containing reacting raw materials and a foaming agent and the step of reacting a polyisocyanate component with a polyol component in the presence of a foaming agent, wherein said polyol component comprises as, all or part thereof, a tertiary aminoalcohol having formula (I):

wherein each $R_1$ is selected from the group consisting of straight or branched alkylene having 2 to 24 carbon atoms, cycloalkylene having 3 to 24 carbon atoms, alicyclic alkylene having 4 to 24 carbon atoms and having 1 to 6 carbon atoms in the alkylene portion, arylene having 6 to 24 carbon atoms, aralkylene having 7 to 24 carbon atoms and having 1 to 6 carbon atoms in the alkylene portion, and $-(CH_2CH_2O)_p-(CH_2CH_2)_q-$, wherein p is zero or a positive number, and q is a positive number, each $R_2$ is selected from the group consisting of straight or branched alkyl having 1 to 24 carbon atoms, aryl having 6 to 24 carbon atoms, and aralkyl having 7 to 24 carbon atoms and having 1 to 6 carbon atoms in the alkylene portion, and wherein n is a positive number of 2 to 50; and wherein said foaming agent comprises $H_2O$ in an amount of 2 to 8 parts by weight, based on 100 parts by weight of the total amount of said polyol component.

26. The process according to claim 25, wherein each $R_1$ is straight or branched alkylene having 6 to 9 carbon atoms, each $R_2$ is straight or branched alkyl having 1 to 4 carbon atoms, and n is a positive number of 2 to 30.

27. The process according to claim 25, wherein said polyol component comprises 1 to 50% by weight of said tertiary aminoalcohol having the formula (I).

28. The process according to claim 25, wherein said reacting of said polyisocyanate component with said polyol component is carried out in the presence of a third component comprising a tertiary aminoalcohol having formula (II):

wherein each $R_3$ is selected from the group consisting of straight or branched alkylene having 2 to 24 carbon atoms, cycloalkylene having 3 to 24 carbon atoms, alicyclic alkylene having 4 to 24 carbon atoms and having 1 to 6 carbon atoms in the alkylene portion, arylene having 6 to 24 carbon atoms, aralkylene having 7 to 24 carbon atoms and having 1 to 6 carbon atoms in the alkylene position, and $-(CH_2CH_2O)_p-(CH_2CH_2)_q-$, wherein p is zero or a positive number, and q is a positive number, each $R_4$ is selected from the group consisting of straight or branched alkyl having 1 to 24 carbon atoms, aryl having 6 to 24 carbon atoms and aralkyl having 7 to 24 carbon atoms and having 1 to 6 carbon atoms in the alkylene portion, and wherein m is a positive number of 2 to 50.

29. The process according to claim 28, wherein the amount of said third component having formula (II) is 30% or less by weight, based on the total amount of said tertiary aminoalcohol having formula (I) and said tertiary aminoalcohol having formula (II).

30. The process according to claim 28, wherein each $R_3$ is straight or branched alkylene having 6 to 9 carbon atoms, each $R_4$ is straight or branched alkyl having 1 to 4 carbon atoms, and n is a positive number of 2 to 30.

31. The process according to claim 1, wherein said polyol component comprises 1 to 50% by weight of said tertiary aminoalcohol having formula (I).

32. The process according to claim 1, wherein each $R_1$ is $-(CH_2CH_2O)_p-(CH_2CH_2)_q-$, wherein p is zero to 15, and q is 1 to 15.

33. The process according to claim 4, wherein each $R_3$ is $-(CH_2CH_2O)_p-(CH_2CH_2)_q-$, wherein p is zero to 15, and q is 1 to 15.

34. The polyurethane according to claim 7, wherein each $R_1$ is straight or branched alkylene having 6 to 9 carbon atoms, each $R_2$ is straight or branched alkyl having 1 to 4 carbon atoms, and n is a positive number of 2 to 30.

35. The polyurethane according to claim 7, wherein said polyol component comprises 1 to 50% by weight of said tertiary aminoalcohol having the formula (I).

36. A polyurethane produced by the process of claim 4, wherein the amount of said third component having formula (II) is 30% or less by weight, based on the total amount of said tertiary aminoalcohol having formula (I) and said tertiary aminoalcohol having formula (II).

37. The polyurethane according to claim 36, wherein each $R_3$ is straight or branched alkylene having 6 to 9 carbon atoms, each $R_4$ is straight or branched alkyl having 1 to 4 carbon atoms, and n is a positive number of 2 to 30.

38. The process according to claim 8, wherein each $R_1$ is $-(CH_2CH_2O)_p-(CH_2CH_2)_q-$, wherein p is zero to 15, and q is 1 to 15.

39. The process according to claim 11, wherein each $R_3$ is $-(CH_2CH_2O)_p-(CH_2CH_2)_q-$, wherein p is zero to 15, and q is 1 to 15.

40. The process according to claim 25, wherein each $R_1$ is $-(CH_2CH_2O)_p-(CH_2CH_2)_q-$, wherein p is zero to 15, and q is 1 to 15.

* * * * *